Patented Dec. 19, 1939

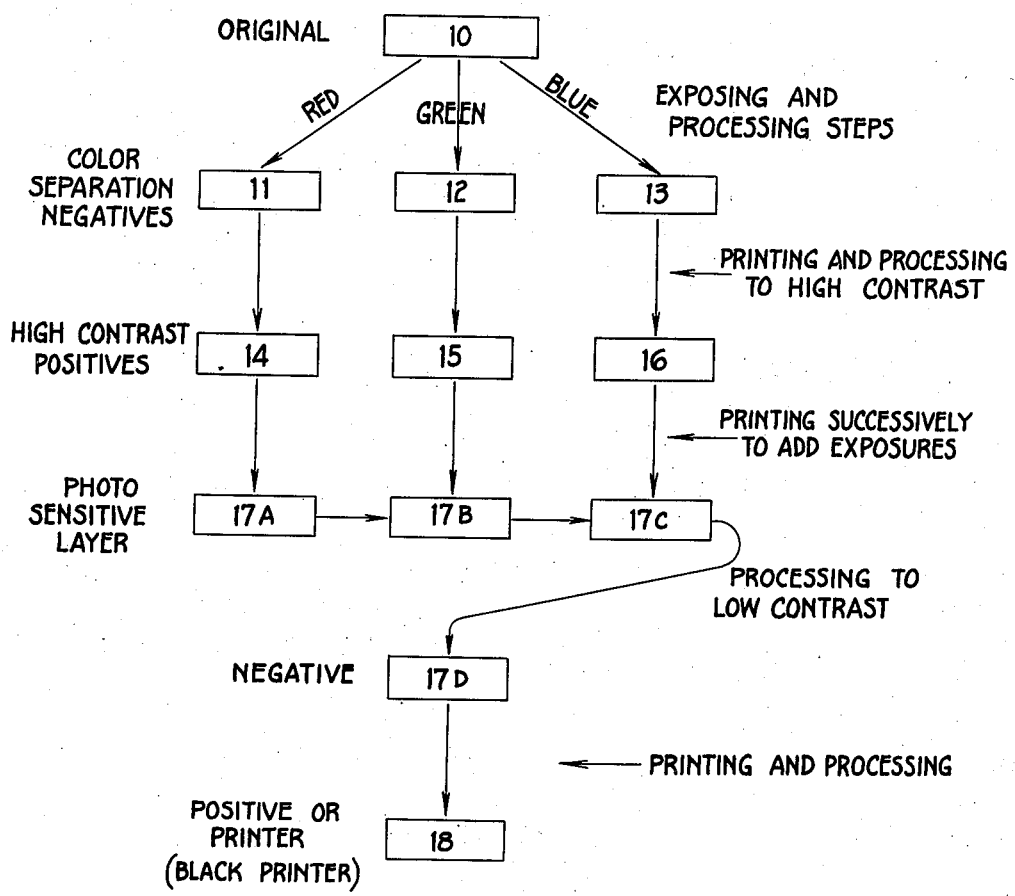

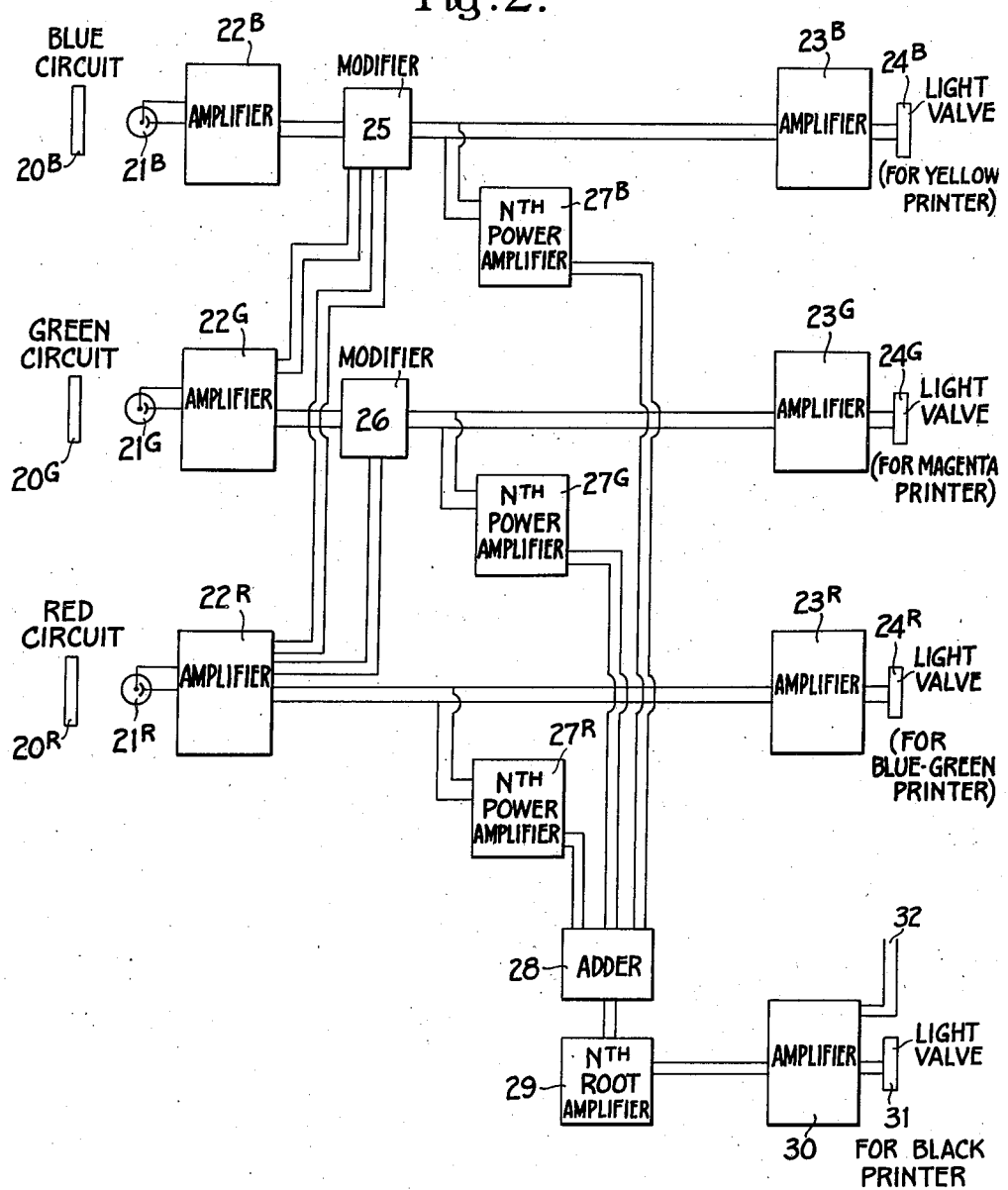

2,183,525

UNITED STATES PATENT OFFICE 2,183,525

BLACK PRINTER

John A. C. Yule, Rochester, N. Y., assignor to Eastman Kodak Company, Rochester, N. Y., a corporation of New Jersey

Application February 18, 1939, Serial No. 257,227

17 Claims. (Cl. 95—2)

This invention relates to photomechanical color reproduction. It relates particularly to black printers for use in four color processes and to methods of making such printers.

It is an object of the invention to provide a highly corrected black printer negative and hence a highly corrected black printer.

It is also an object of the invention to provide a method of making a black printer which may be performed either photographically or electro-optically.

To avoid ambiguity regarding the various nomenclature conventions, the one here used will now be outlined. The primary colors are red, green, and blue. The reflectivities, to the three primary colors, of any point of the original which is to be reproduced are: $Rr$, $Rg$, and $Rb$. The corresponding printing inks are the subtractive primaries, blue-green, magenta and yellow.

The color separation negatives made through the three primary color filters have at each point, densities: $Dr$, $Dg$, and $Db$. If a black printer negative is made, its corresponding density is defined as $Dx$. If correction is introduced corresponding to the masking method of color correction, these densities are called $\Delta r$, $\Delta g$, $\Delta b$, and $\Delta x$. Positives made from each of these negatives will have the respective densities, $D'r$, $D'g$, $D'b$, and $D'x$. These densities will be (for purposes of computation) equal to the printing densities of the final printers. These corresponding printing densities are defined as $Dbg$, $Dm$, $Dy$, and $Dblack$. Following the usual rule that density $$D = \log \frac{1}{T}$$

the positives have certain transparencies. Although the printers are not actually transparent, it is convenient for the purposes of the present invention to speak of the printer transparencies, which are related to the printing densities according to this rule. When the original is reproduced by a three-color process these transparencies are defined as $Tbg$, $Tm$, and $Ty$. These transparencies are preferably but not necessarily those of printers produced by processes involving color correction corresponding to masking. In four-color processes the transparencies are defined as. $T'bg$, $T'm$, $T'y$ and $T'x$. Obviously at any point where the black printer prints, $T''y$ is greater than $Ty$, because part of the printing density has been assigned over to the black printer which has a transparency $T'x$.

In actual practice the black printer is often used with color printers which have not been reduced, i. e. with printers which are correct for a three color process.

In addition to defining the nomenclature used, it is necessary to give an exact definition to some of the terms used in this specification and the accompanying claims. This is particularly necessary since the invention may be practiced equally well with photographic or electro-optical systems. In the simplest form of electro-optical systems, for example those used in color television, the original to be reproduced is scanned in the three primary colors and signals corresponding to the 1espective colors are set up in the red, green and blue channels of the electrical circuit used. These signals correspond to the images of the color separation negatives made in a photographic color process. In both systems these will be spoken of as color separation records of the original. The electro-optical signals are positive records whereas the color separation negatives are negative records.

In a copending application Serial Number 120,964, filed January 16, 1937, Murray and Morse describe a method of introducing color correction in such an electro-optical system. In a copending application Serial Number 234,422, filed October 11, 1938, Hall describes the use of non-linear amplifiers in electro-optical color systems. For convenience, I define the effect of a non-linear amplifier, which amplifies to the power $N$, as changing the contrast of the records. That is, the non-linear amplifier introduces a contrast $N$. This is particularly useful terminology since the change in contrast of the records corresponds exactly to the effect of developing the color separation negatives in a photographic process to a contrast $N$. Incidentally, electro-optical systems having linear amplifiers with various mutual conductance values do not affect the contrast since the signals correspond to exposures, (i. e. correspond to reflectivities) and hence the factor introduced by a different mutual conductance value corresponds merely to adding or subtracting a constant density. A change in contrast on the other hand involves multiplying the densities by a factor.

The "adding of separation records linearly," which is an important feature of the present invention, also requires a special definition to cover both photographic and electro-optical systems and will be fully understood from the detailed description of the two embodiments.

A brief history of the development of corrected black printers is necessary for the understanding of my invention. Parallel with the development of color correction wherein the amount of one color which is printed is modified in accordance with the amount of another color, has been the development of black printers. Because of the hope that color reproduction processes would some day be developed to the stage where black printers are unnecessary and because the amount of correction gained by the use of a black printer is relatively less than that obtained by correction of the color printers, the development of the black printer has, until recent years, apparently lagged behind other types of color correction.

Theoretically there are two ideal types of black printers and practically, any form of black printer between these two types is useful. What constitutes an ideal black printer depends, of course, on other features of the process in which it is used. If the three color printers are arranged as in a three color process to reproduce the original, including the blacks, as nearly as possible, an ideal black printer is one which merely takes care of the deficiencies in the three-color process. The other extreme is the preferable one wherein all blacks and grays are reproduced by the black printer and the color printers have printing densities reduced from that which they had in a three-color process, by the amount which is taken care of by the black printer.

One of the earliest and even now one of the commonest methods of making a black printer negative is to expose a panchromatic film or plate to the original through a light yellow filter. It is well known that this does not produce a good black printer, i. e. one in which all saturated colors have been eliminated without loss of the light tones in the gray scale. Mathematically this exposure $$E = C_1 R_g + C_2 R_r$$

in which $C_1$ and $C_2$ are constants. Therefore, $$D_x = \gamma \log (C_1 R_g + C_2 R_r)$$

where $\gamma$ is the contrast to which the negative is developed.

An equivalent system was proposed by Albert in 1897 in his German Patent 101,379 wherein he successively exposes through no filter, through a red filter and through a green filter. This adds a very small amount of blue to his original exposure and hence differs slightly from the mathematic equation given above. Actually however a yellow filter also passes a very small amount of blue and hence the two systems are equivalent and the equation should contain a blue term. The blue effect is however relatively small.

The following year Albert (German Patent 116,538) set up what he believed to be an ideal black negative and attempted to produce it by combining a "corrected" positive with an uncorrected negative. The positive corresponded to a yellow filter and the negative to a blue filter. All of the variations which he described are mathematically equivalent to his original mask, i. e. the one used in making his corrected positive, or equivalent to this mask combined with a flat uncorrected negative or positive. Subsequent theories and practice have shown that such methods are applicable only to the reproduction of originals containing a limited range of colors and even then there is only little improvement over the yellow separation negative method.

Selecting one type of black printer as representative of the innumerable improvements discovered empirically during the subsequent years, attention is directed to U. S. 1,576,118, wherein Hahn makes a black negative as follows:

A red filter negative mask is combined with the original (or rather the optical image of it), a negative is made from the combination using a green filter, a supplementary exposure being given with a red filter and no mask. The equation for the exposure received by the negative is:

$$E = \frac{C_3 R_g}{R_r \gamma} + C_4 R_r$$

where gamma $\gamma$ equals the contrast of the mask, assuming that it is on the straight line portion of the characteristic curve, $C_3$ and $C_4$ are constants. If gamma has a suitable value, $R_g/R_r$ is the transmission of a positive corrected as in masking with an overall contrast (compared to the original) of $1-\gamma$. This method appears to be an advance over the yellow filter negative method since a corrected instead of the uncorrected green separation record is used. Otherwise there is little difference between the two.

In common with the simple yellow filter negative method, Hahn's system is applicable only over a limited range of colors. For example if one point of the original has a violet color, the black negative will at that point receive only about $\frac{1}{10}$ of the correct amount of light.

In a copending application Serial Number 44,125, filed October 8, 1935, Murray suggests the use of infrared instead of yellow in making a black printer negative. For most color pigments in the original, i. e. all of those which are transparent in the infrared, this gives a black printer unaffected by the colors. If the original is painted so that all grays or gray components are made up entirely of a black pigment which absorbs infrared, (i. e. at no point are the three subtractive primaries mixed) such a black printer is of the second ideal type taking care of all grays. When the original has grays made by mixing the three subtractive primaries, these grays are reproduced by the color printers rather than the black printer.

In my copending application Serial Number 138,351, filed April 22, 1937, I described a black printer whose printing density at each point is equal to the least predominant subtractive color content of the color of the corresponding point of the original. Such a printer takes care of all grays and gray components of each color in the original independent of their physical composition. In that application I describe two of the most promising methods of making such a printer. Hall and Morse describe a third method in their application Serial Number 215,822, filed June 25, 1938. No methods of producing such a printer were known prior to my invention. Both practically and theoretically such printers are superior to any previously produced and are equally useful with any range of colors (except for second order effects). Murray's "infrared" black printer is for most practical purposes equivalent to this one when used with a suitable original, but of course differs therefrom in the way discussed above.

Although for practical purposes the present invention gives a black printer which takes care of all grays and blacks and which is approximately equivalent to that described in my copending application, the present invention actually relates to a process which is entirely different from those described and the resultant printer is actually different in printing density and "printing transparency" from those obtained and described in that application.

According to the present invention there is provided a black printer whose printing transparency at each point is $T'x$ where $$T'x = \sqrt[N]{T_{bg}{}^N + T_m{}^N + T_y{}^N}$$

where $T_{bg}$, $T_m$ and $T_y$ are the printed transparencies of a three-color process as described above and N is a number equal to or greater than 1.0 and preferably greater than 1.5. Such a printer may be used either with the color printers intended for a three-color process or preferably with color printers in which the densities have been reduced by the amount which is to be printed by this black printer.

From my copending application method above, it is obvious that the black printer printing transparency should be equal to the printing transparency $T_{bg}$, $T_m$, or $T_y$ whichever is the greatest. Mathematically, it is obvious that the Nth root of the sum of the Nth powers of any three numbers will be approximately equal to whichever is greatest of the three numbers as N tends to infinity. For example if one of the numbers is large compared with either of the others, it is obvious that the sum of the Nth power of the three numbers is not very much greater than the Nth power of this large number alone. Even under the worst possible conditions, i. e. that when the three numbers are absolutely equal, the Nth root of the sum of the Nth powers of the three numbers will only be the Nth root of 3 times one of the numbers.

Applying this methematical phenomenon to black printers it has been found that a black printer whose printing transparency is $$\sqrt[N]{T_{bg}{}^N + T_m{}^N + T_y{}^N}$$

gives better quantitative results than the yellow filter negative method even when N equals 1 if color correction corresponding to masking has been included in the establishing of the color printer transparencies and even when used with color printers intended for a three-color process. Where no correction equivalent to masking is used, N should be slightly greater say N=1.3 or 1.4 to get results as good as the yellow filter negative method which is unrelated to this invention but which forms a convenient standard of quality. When N equals 1, $$T^1x = T_{bg} + T_m + T_y$$

Although the ideal situation would be one wherein N is very large, it is difficult in practice to produce such a system wherein N is greater than 10, say. I have found that for practical purposes a system wherein N is larger than 1.0 gives satisfactory results and N equal to 2 gives excellent quality.

As a special modification, it is sometimes desirable when N is only 2 or 3 to take care of the $$\sqrt[N]{3}$$

factor, discussed above, which occurs for pure grays wherein $T_{bg} = T_m = T_y$. In the case of pure gray $T'x$ should equal one of these whereas a system which has, N=3 gives:

$$T'x = \sqrt[3]{3}T_y$$

Although pure grays are somewhat rare and any color differing by any appreciable degree from gray is satisfactorily reproduced, one may compensate for the error in grays by some form of compromise. For example $$T'x = \sqrt[N]{\frac{T_{bg}{}^N + T_m{}^N + T_y{}^N}{P}}$$

where P has some value between 1 and 3. For pure gray P should be 3 and for any pure color P should be 1. If N is at all large, even colors only slightly different from gray require a P not very different from 1. With N between 2 and 10 (e. g. N=3), I have found that P=1.2 gives a good compromise for an ordinary range of colors. Obviously this differs only slightly from the more general case where P equals 1. With N between 1 and 2, I have found that P=1.5 is best. In general P must be between 1 and 3.

Figures 1 and 2 show respectively a photographic and an electro-optical embodiment of my invention.

In both cases, the black printer separation negative is produced by forming red, green and blue positive separation records of the original with a contrast N with respect to the original where N is a number greater than 1, by adding the three records linearly to give a combination record and by forming from this combination record a photographic negative having a contrast substantially 1/N with respect to the combination record. A printer may be made from this negative, in any of the well known manners either by printing directly or by making an intermediate positive. The first step of this process which involves the making of high contrast positive records of the originial may or may not include an intermediate positive or negative record. This first step preferably includes some form of color correction such as or equivalent to masking.

This gives a black printer whose printing transparency $T'x$ is $$\sqrt[N]{T_{bg}{}^N + T_m{}^N + T_y{}^N}$$

and whose printing density D black is according to the equation $$D\ black = \frac{1}{N} \log \frac{1}{T_{bg}{}^N + T_m{}^N + T_y{}^N}$$

$$= \frac{-1}{N} \log (T_{bg}{}^N + T_m{}^N + T_y{}^N)$$

Computing back from this it is seen that the black printer negative has a density $$\Delta x = C_5 + \frac{1}{N} \log (T_{bg}{}^N + T_m{}^N + T_y{}^N)$$

where $C_5$ is constant. This equation is easily visualized from either of the embodiments shown. The normal positive transparencies $T_{bg}$, $T_m$ and $T_y$ are separately raised to the power N (i. e. given the contrast N). Then they are added linearly and constitute the exposure of the black printer negative which is made to have a contrast $$\frac{1}{N}$$

with respect to this exposure. This is obviously the interpretation of the last equation and the description of the embodiments shown will be seen to conform exactly with this interpretation.

Incidentally since the final result is to have $T'x$ dependent only on the largest of the color printer transparencies, the same effect could be gained by having a $\Delta x$ equal to the density of the largest of the three printer negatives, $\Delta r$, $\Delta g$ and $\Delta b$, i. e.

$$\Delta_x = \sqrt[N]{\Delta_r{}^N + \Delta_g{}^N + \Delta_b{}^N}$$

Although the two equations for black printer negatives give results which are equivalent practically, they are obviously not the same mathematically.

In the embodiment shown in Figure 1 a multi-color original scene or picture is photographed through red, green and blue filters in the usual way making color separation negatives 11, 12, and 13. From each of these negatives a high contrast positive is made by suitable printing and processing. If desired, the negatives may be suitably masked as in color correction processes. The respective high contrast positives are 14, 15, and 16. The high contrast records which constitute the images in the positives are then added by printing successively onto a sensitive photographic layer shown in this flow chart at the positions 17A, 17B and 17C while it receives the respective exposures. These exposures are spoken of as being equal, but the actual time of each exposure depends, of course, on the actual density of the negatives and the positives. After receiving these three successive equal exposures the photosensitive layer is developed to a low contrast to form a negative 17D. The contrast of this negative 17D should have a value with respect to the positives 14, 15, and 16 which is substantially reciprocal to that of the value of the contrast of the positives 14, 15, and 16 with respect to the original 10. The negative 17D forms the black printed negative and a black printer or a black printer positive 18 may be made therefrom in the usual manner. In the preferred use of my invention, this black printer is employed with color printers whose densities have been proportionally reduced.

In the embodiment shown in Figure 2, the original, not shown, is scanned by any of the well known methods used in electrooptical systems, and the light is passed through blue, green and red filters 20B, 20G and 20R respectively to photocells 21B, 21G and 21R to set up signals in the usual way in the blue, green, and red channels. These signals which constitute positive color separation records of the original in the usual manner of electro-optical systems are then suitably amplified by amplifiers 22B, 22G, and 22R respectively.

If desired, color correction may be introduced in the manner taught by Murray and Morse in their copending application mentioned above, by suitable modifiers 25 and 26. Such correction is, however, not absolutely necessary to or part of the present invention. The signals then pass through amplifiers 23B, 23G and 23R to operate light valves 24B, 24G, and 24R, which control the exposure for making color separation negatives, positives or printers in any suitable manner such as that described by Murray and Morse.

According to the present invention, a portion of each signal is passed through an Nth power amplifier shown respectively at 27B, 27G and 27R to form high contrast positive color separation records of the original. These records are then added by any suitable adder 28 which may consist of a simple resistance across which the three signals are additively impressed. Any method of adding the three signals linearly may be employed. This combined high contrast signal is then passed into a Nth root amplifier 29 and through a suitable linear amplifier 30 to operate a light valve 31. Depending upon the arrangement of this light valve, it may be used in the usual manner to control the scanning exposure for a black printer negative or for a black printer positive.

With the arrangement shown the negatives or positives produced by the light valves 24B, 24G, and 24R would be those intended for a three color process and would include that portion of the record which has also been assigned to the black printer produced by the light valve 31. As pointed out above, a four-color process preferably is arranged so that the yellow, magenta and blue-green printers are reduced in density by the amount assigned to the black printer. This may be done in the manner taught by Murray and Morse in their application mentioned previously, by placing in each channel a modifier controlled by the final black signal. For example, modifiers in the blue, green and red channels may be connected to the leads 32, in the same manner as the modifier 25 is connected to the amplifier 22G.

Having thus described in detail two embodiments of my invention and the manner whereby the invention fits into the development of black printers in general, I wish to point out that the invention is not limited to these specific embodiments but is of the scope of the appended claims.

What I claim and desire to secure by Letters Patent of the United States is:

1. For use in a four-color photo-mechanical process corresponding to a three-color process in which the blue-green, magenta and yellow printers have respective printing transparencies at corresponding points with values $Tbg$, $Tm$, and $Ty$, a black printer whose printing transparency at each corresponding point is $$\sqrt[N]{T_{bg}^N + T_m^N + T_y^N}$$

when N is a number greater than 1.

2. For use in a four-color photo-mechanical process corresponding to a three-color process in which the blue-green, magenta, and yellow printers have printing transparencies at corresponding points with values $Tbg$, $Tm$, and $Ty$ respectively, a black printer whose printing transparency at each corresponding point is $$\sqrt[N]{\frac{T_{bg}^N + T_m^N + T_y^N}{P}}$$

where N is a number greater than 1 and P is a number between 1 and 3.

3. For use in a four-color photo-mechanical process corresponding to a three-color process in which the blue-green, magenta, and yellow printers have printing transparencies at corresponding points with values $Tbg$, $Tm$ and $Ty$, respectively, a black printer whose printing transparency at each corresponding point is $$\sqrt[N]{\frac{T_{bg}^N + T_m^N + T_y^N}{P}}$$

where N is a number greater than 1.5 and P is a number between 1 and 1.5.

4. A black printer negative for use in a photo-mechanical process in which the red, green, and blue separation negatives have densities $Dr$, $Dg$ and $Db$ respectively, at corresponding points, said black printer negative having at each corresponding point a density equal to $$\sqrt[N]{D_r^N + D_g^N + D_b^N}$$

where N is a number greater than 1.5.

5. In a photo-mechanical process for reproducing a multicolored original, the method of making a black printer negative which comprises forming red, green, and blue positive separation records of the original with a contrast N with respect to the original where N is a number greater than 1, adding the three records linearly to give a combination record, forming from this combination record a photographic negative having a contrast of substantially 1/N with respect to the combination record.

6. A method of making a black printer negative according to claim 5 where N is a number greater than 1.5.

7. In a photo-mechanical process for reproducing a multi-colored original, the method of making a black printer negative which comprises forming red, green and blue positive separation records of the original with a contrast N with respect to the original where N is a number greater than 1, adding linearly an equal fraction, $$\frac{1}{P}$$

of each of the records to give a combination record, where P is a number between 1 and 3, forming from this combination record a photographic negative having a contrast substantially 1/N with respect to the combination record.

8. A method of making a black printer negative according to claim 5 wherein the step of forming the positive separation records of the original includes color correction of the type wherein at least one record is reduced in proportion to the intensity of at least one other record.

9. A method of making a black printer negative according to claim 7 wherein the step of forming the positive separation records of the original includes color correction of the type wherein at least one record is reduced in proportion to the intensity of at least one other record.

10. In a photo-mechanical process for reproducing a multicolored original, the method of making a black printer which comprises forming red, green and blue separation records of the original, forming from each of these records, high contrast records which are positive with respect to the original and which have a contrast N with respect to the original where N is a number greater than 1, adding an equal fraction $$\frac{1}{P}$$

of said high contrast records linearly to give a combination record where P is a number between 1 and 3, forming from this combination record a negative having a contrast substantially 1/N with respect to the combination record and printing a printer from this negative.

11. In the process of making a black printer for use in a four-color photo-mechanical process for reproducing a multicolored original, the steps which comprise forming high-contrast positive primary-color separation records of the original having a contrast N with respect to the original where N is a number greater than 1, adding these records linearly to give a combination record and forming a negative from this combination record with a contrast substantially 1/N with respect to the combination record, whereby a negative suitable for making a black printer is produced.

12. In a four-color photo-mechanical process for reproducing a multicolored original, the method of making a black printer negative which comprises exposing three photographic layers respectively to each of the primary colors from the original to form color separation negatives of the original, printing from these negatives three photographic layers, respectively processing these latter layers to high contrast to form color separation positives having a contrast N with respect to the original where N is a number greater than 1, successively exposing a photographic layer in printing relation to each of the three positives, and processing this triply exposed layer to a contrast substantially 1/N with respect to the positives to form a negative.

13. In a four-color photo-mechanical process for reproducing a multicolored original the method of making a black printer which comprises making a negative according to claim 12 and printing a positive printer therefrom.

14. The method of making a black printer negative according to claim 12 where N is a number greater than 1.5.

15. The method of making a black printer negative according to claim 12 in which at least one color correction mask is made from one of the color separation negatives of the original and placed in register with another of said color separation negative during the step of printing a photographic layer from this latter negative.

16. In an electro-optical system carrying three primary color signals in separate channels for color reproducing, the method of making a black printer including the step of forming a black printer signal which step comprises amplifying an equal portion of each of the three primary color signals by an Nth power amplifier where N is a number greater than 1, adding the amplified signals linearly to form a combined signal and amplifying the combined signals by a 1/N power amplifier to give a black printer signal, the step of operating a light valve by this signal and the step of forming a black printer separation record in accordance with the response of the light valve.

17. The method of making a black printer negative according to claim 16 where N is a number greater than 1.5.

JOHN A. C. YULE.